(12) United States Patent
Imaizumi et al.

(10) Patent No.: US 6,328,290 B1
(45) Date of Patent: Dec. 11, 2001

(54) HELICAL COMPRESSION SPRING FOR A VEHICLE SUSPENSION

(75) Inventors: Toshiyuki Imaizumi, Toyoake; Toshiho Aoyama, Nagoya; Shuji Kamiya, Kariya; Takashi Gotoh, Chiryu; Koichi Irie, Toyoake, all of (JP)

(73) Assignee: Chuo Hatsujo Kabushiki Kaisha, Aichi pref. (JP)

( * ) Notice: Subject to any disclaimer, the term of this patent is extended or adjusted under 35 U.S.C. 154(b) by 0 days.

(21) Appl. No.: 09/359,806

(22) Filed: Jul. 26, 1999

(30) Foreign Application Priority Data

Jul. 31, 1998 (JP) .................................................. 10-230207
May 20, 1999 (JP) .................................................. 11-140649

(51) Int. Cl.$^7$ .................................................. B60G 11/14
(52) U.S. Cl. ............................. 267/28; 267/179; 267/180
(58) Field of Search .................................... 267/180, 179, 267/248, 249, 254, 255, 286, 166, 166.1, 167; 280/124.145

(56) References Cited

U.S. PATENT DOCUMENTS

| | | | |
|---|---|---|---|
| 2,576,824 | * | 11/1951 | Bush .............................. 280/124.128 |
| 3,573,880 | * | 4/1971 | Sakai ..................................... 267/286 |
| 3,966,222 | * | 6/1976 | Felburn ................................ 267/253 |
| 4,771,989 | * | 9/1988 | Smith ................................... 267/292 |
| 4,793,597 | * | 12/1988 | Smith ................................ 267/166.1 |
| 4,903,985 | * | 2/1990 | Muhr et al. ........................... 267/180 |

FOREIGN PATENT DOCUMENTS

| | | |
|---|---|---|
| 3403882 A1 | 8/1984 | (DE) . |
| 0526689 | * 2/1993 | (EP) . |
| 0 526 689 A1 | 2/1993 | (EP) . |
| 0 780 602 A1 | 8/1996 | (EP) . |
| 0 791 491 A1 | 8/1997 | (EP) . |
| 2 540 586 A1 | 8/1984 | (FR) . |
| 2 670 437 | 6/1992 | (FR) . |
| 1193713 | 7/1970 | (GB) . |
| 48-39290 | 11/1973 | (JP) . |
| A08-142622 | 6/1996 | (JP) . |
| 2642163 | 5/1997 | (JP) . |

OTHER PUBLICATIONS

Satoshi Suzuki et al., "Approaches to Minimizing Side Force of Helical Coil Springs for Riding Comfort" Feb. 26–29, 1996, pp. 15–22.

Satoshi Suzuki et al., "Approaches to Minimizing Side Force of Helical Coil Springs in Suspension Design" Aug. 28, 1995, pp. 19–27.

"Optimization of Force Action Line with New Spring Design on the Macpherson Strut Suspension for Riding Comfort", Takashi Gotoh et al., Society of Automotive Engineers, Inc., 2000.

"Close–up", Nikkei Mechanical, No. 551, Aug. 2000.

"Optimization of Force Action Line with New Spring Design on the Macpherson Strut Suspension for Riding Comfort", Takashi GOTOH et al., Society of Automotive Enginneers, Inc., 2000.

"Close–up", Nikkei Mechanical, No. 551, Aug. 2000.

* cited by examiner

*Primary Examiner*—Robert J. Oberleitner
*Assistant Examiner*—Robert A. Siconolfi
(74) *Attorney, Agent, or Firm*—Oliff & Berridge, PLC

(57) ABSTRACT

The present invention is directed to a helical compression spring which is mounted on a vehicle body to be compressed between an upper seat and a lower seat. The spring has a coil axis that is substantially curved at a predetermined radius of curvature in an unloaded state of the spring. A pitch of a lower end coil of the spring is set to tilt the end plane of the lower end coil at a first predetermined angle to the lower seat in the direction for shortening the longitudinal length of the spring at the inside of the curvature, and/or a pitch of an upper end coil is set to tilt the end plane of the upper end coil at a second predetermined angle to the upper seat in the direction for shortening the longitudinal length of the spring at the outside of the curvature. The coil axis of the spring may be substantially curved in accordance with at least two radiuses of curvature in the unloaded state of the spring. Or, the coil axis may comprise a plurality of rectilinear lines connected to be substantially curved at the predetermined radius of curvature in the unloaded state of the spring.

16 Claims, 17 Drawing Sheets

HELICAL COMPRESSION SPRING FOR A VEHICLE SUSPENSION

BACKGROUND OF THE INVENTION

1. Field of the Invention

The present invention relates to a helical compression spring for a vehicle suspension, and more particularly to the helical compression spring for use in a strut type vehicle suspension.

2. Description of the Related Arts

In general, a vehicle suspension is provided with a helical compression spring, which is generally designed to provide a coil axis that coincides with the direction of reaction force of the spring. Various types of vehicle suspension system have been known heretofore. Among them, a strut type suspension with a shock absorber employed as a strut for positioning a wheel is popular. According to the strut type suspension, however, due to a displacement between its load input axis and strut axis, a bending moment is exerted on the strut, with side force acting on a guide and a piston of the strut. This side force prevents the piston from sliding smoothly in the guide to act as the shock absorber. In order to compensate the bending moment, it has been known to arrange a coil axis of a cylindrical helical compression spring to be offset from the strut axis.

Since the arrangement between the coil axis of the helical compression spring and the strut axis of the shock absorber is determined geometrically, it has been required that the helical compression spring should be designed to coincide its coil axis with the direction of reaction force of the spring. In order to meet such requirement, various studies have been made, including the article "Approaches to Minimizing Side Force of Helical Coil Springs in Suspension Design", presented by engineers including inventors of the present application, and published by Japan Society for Spring Research on Aug. 28, 1999, and the article "Approaches to Minimizing Side Force of Helical Coil Springs for Riding Comfort", SAE Technical Paper No.960730, pages 15–22, by the same persons as the engineers as mentioned above, both of which are hereby incorporated by reference. In those articles, it was aimed to minimize the reactive side force of the helical compression spring.

In Japanese Utility Model Publication No.48-39290, proposed is a method for mounting on a vehicle a conventional cylindrical coil spring having a straight coil axis in an unloaded state, to be curved in the direction substantially vertical to the center line of the spring. Also proposed is a method for forming a coil spring with the center line thereof curved in advance in an unloaded state, and mounting it on the vehicle in such a state that the center line is straightened, to produce a moment by the reactive side force of the spring. According to those methods, the coil spring is mounted on the vehicle to be elastically deformed in the direction substantially vertical to the center line of the spring, to cause a side load which acts on a damper strut to produce a moment acting thereon in opposition to a moment caused by reaction force from a road, thereby to reduce the side force which will act on a bush and a piston of the damper strut.

Also proposed in British Patent No.1198713 is a strut type vehicle suspension, wherein a coil spring when installed in a suspension assembly is stressed, asymmetrically of its axis so as to impart to a shock absorber a bending moment in opposition to that imparted by a wheel support. In FIG.2 of the British Patent, there is disclosed a helical spring which is coiled along a substantially straight line, and the two end turns of which are bent over by an angle α° towards one another. The planes which pass through a support surface of the unloaded helical spring converge towards the inside of the vehicle, whereas the spring plates connected to a housing and to a guide rod of the shock absorber, respectively, are arranged to parallel to one another. As a result, it is stated that a greater bias is produced on the half of the helical spring facing the outside of the vehicle than on the half facing the inside of the vehicle, so that a bending moment is exerted by the biasing force, opposite to the bending moment exerted by the wheel load on the shock absorber. FIG.3 of the British Patent shows a helical spring which is coiled about an arc axis of the unloaded spring, and two support surfaces which extend obliquely at an angle to one another.

When the helical spring is fitted between the parallel plates, and the longer surface line of the unloaded helical spring faces the outside of the vehicle, the outer half of the helical spring is compressed to a greater extent than the half which faces the inside of the vehicle. Referring to FIG.4 of the British Patent, two plates are arranged to extend obliquely at an angle to one another, one being connected to the outer member of the shock absorber and the other to the inner member, the point of intersection of the two planes lying on the outside of the vehicle. And, a straight-coiled, cylindrical helical spring is compressed between the two plates, so that the half of the helical spring facing the outside of the vehicle is compressed to a greater extent than the half facing the inside of the vehicle.

Furthermore, a wheel suspension having a helical compression spring, the center line of which has an approximately S-shaped course in an unloaded state, has been proposed in a Japanese patent No.2642163, which claims a convention priority to one of two German patent applications to which U.S. Pat. No. 4,903,985 claims the convention priority, having FIG.6 which is different from its corresponding FIG.6 in the Japanese patent which was amended in the prosecution before the Japanese Patent Office. According to the Japanese patent, the invention was aimed to enable reduce a side force applied to a piston rod of a shock absorber to a great extent, in view of the fact that because tires are becoming wider and wider, hence shifting the wheel-to-road contact point outward, larger and larger angles between the line of support action and the shock absorber axis arise, so that the helical compression spring can not be positioned as obliquely with respect to the shock absorber axis as would actually be desired. In the Japanese patent, a helical compression spring, the center line of which is curved in an unloaded state, has been disclosed as a prior art in FIG.5, and about which it is stated that the radius of curvature of the spring center line is constant, and that the line of the spring action is merely shifted from the center line of the helical spring, so that it is difficult to reduce the side force sufficiently. In other words, it has been concluded in the Japanese patent that the helical compression spring with its center line curved in the unloaded state is not to be employed.

With respect to the vehicle suspension, further reduction in size is required, so that it is difficult to compensate a bending moment exerted on a strut due to load from a road, by means of mere improvement to the strut and a supporting mechanism, using a conventional cylindrical helical compression spring. Rather, it is necessary to positively increase the reactive side force of the helical compression spring for use in the strut type suspension. However, it is not easy to produce a desired reactive side force of the conventional helical compression spring.

According to the structure for forming the coil spring with the center line thereof curved in advance in the unloaded state, and mounting it on the vehicle in such a state that the center line is straightened, as disclosed in Japanese Utility model Publication No.48-39290, it is difficult to install the spring on the strut type suspension appropriately, and hard to expect a desired effect. In that Publication, no appropriate type of the coil spring for use in that structure has been disclosed. Although the structure of the coil spring for use in the suspension of GB Patent No.1198713 has been disclosed, it is difficult to mount the spring and hard to expect a desired effect, too. In this respect, it is stated in the Japanese Patent No.2642163 as described before that it is difficult to achieve the sufficient reduction of the side force acting on the guide portion of the strut and the piston. Furthermore, it is difficult to manufacture the compression spring having the approximately S-shaped center line in the unloaded state as disclosed in the Japanese Patent No.2642163, which will cause increase in cost.

From the foregoing, it can be concluded that only by curving the helical compression spring as described above, the reaction force axis, or the line of the spring action, is shifted from the coil axis, or the center line of the helical compression spring, in parallel with each other, to be apart from the center line of the upper end plane of the helical compression spring. As a result, eccentric force will be exerted on the upper seat to deteriorate a structure for supporting the upper seat.

SUMMARY OF THE INVENTION

Accordingly, it is an object of the present invention to provide a helical compression spring for applying a desired side force to a strut of a vehicle suspension, when mounted on a vehicle, with a simple structure.

In accomplish the above and other objects, a helical compression spring according to the present invention is mounted on a vehicle body to be compressed between an upper seat and a lower seat, and includes a coil axis that is substantially curved at a predetermined radius of curvature in an unloaded state of the spring. A pitch of a lower end coil of the spring is set to tilt the end plane of the lower end coil at a first predetermined angle to the lower seat in the direction for shortening the longitudinal length of the spring at the inside of the curvature, and/or a pitch of an upper end coil is set to tilt the end plane of the upper end coil at a second predetermined angle to the upper seat in the direction for shortening the longitudinal length of the spring at the outside of the curvature.

Therefore, the helical compression spring may be embodied as follows.

Firstly, the helical compression spring may be formed with a coil axis that is substantially curved at a predetermined radius of curvature in an unloaded state of the spring, and formed with a pitch of a lower end coil that is set to tilt the end plane of the lower end coil at a first predetermined angle to the lower seat in the direction for shortening the longitudinal length of the spring at the inside of the curvature.

Secondly, the helical compression spring may be formed with a coil axis that is substantially curved at a predetermined radius of curvature in an unloaded state of the spring, and formed with a pitch of an upper end coil that is set to tilt the end plane of the upper end coil at a second predetermined angle to the upper seat in the direction for shortening the longitudinal length of the spring at the outside of the curvature.

Thirdly, the helical compression spring may be formed with a coil axis that is substantially curved at a predetermined radius of curvature in an unloaded state of the spring, and formed with a pitch of a lower end coil that is set to tilt the end plane of the lower end coil at a first predetermined angle to the lower seat in the direction for shortening the longitudinal length of the spring at the inside of the curvature, and a pitch of an upper end coil that is set to tilt the end plane of the upper end coil at a second predetermined angle to the upper seat in the direction for shortening the longitudinal length of the spring at the outside of the curvature.

It may be so arranged that the pitch of the lower end coil is set to tilt the end plane of the lower end coil at the first predetermined angle to the lower seat in the direction for shortening the longitudinal length of the spring at the inside of the curvature, and that the center of the end plane of the upper end coil is offset to the center of the end plane of the lower end coil in the direction of the inside of the curvature.

Or, it may be so arranged that the pitch of the upper end coil is set to tilt the end plane of the upper end coil at the second predetermined angle to the upper seat in the direction for shortening the longitudinal length of the spring at the outside of the curvature, and that the center of the end plane of the lower end coil is offset to the center of the end plane of the upper end coil in the direction of the outside of the curvature.

The upper end coil of the spring may be formed in a pig tail configuration, and/or the lower end coil of the spring is formed in the pig tail configuration.

The coil axis of the spring may be substantially curved in accordance with at least two radiuses of curvature in the unloaded state of the spring. Or, the coil axis of the spring may comprise a plurality of rectilinear lines connected to be substantially curved at the predetermined radius of curvature in the unloaded state of the spring.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
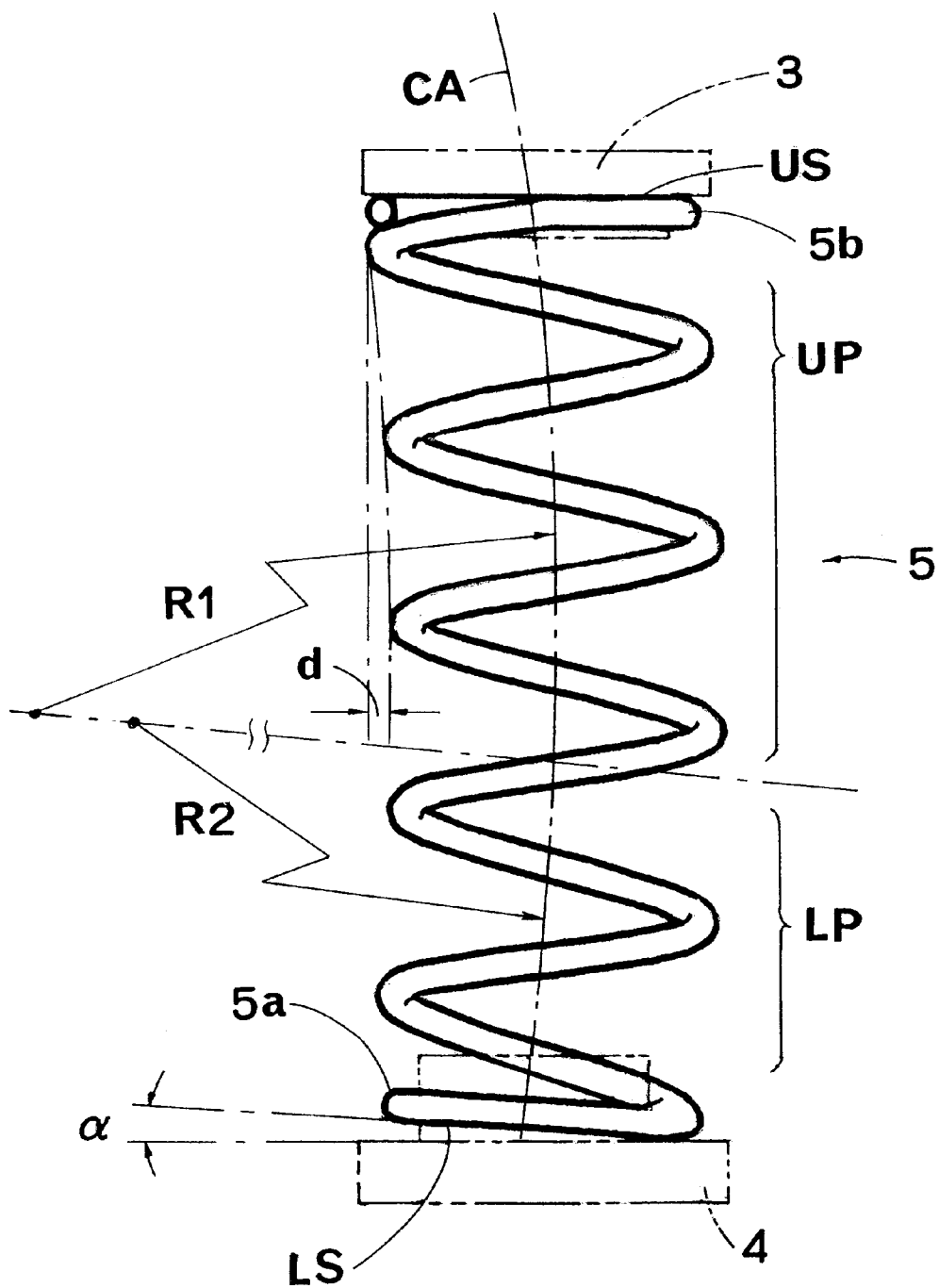
FIG. 1 is a sectional view of a helical compression spring for use in a vehicle suspension according to an embodiment of the present invention.
Figure 2:
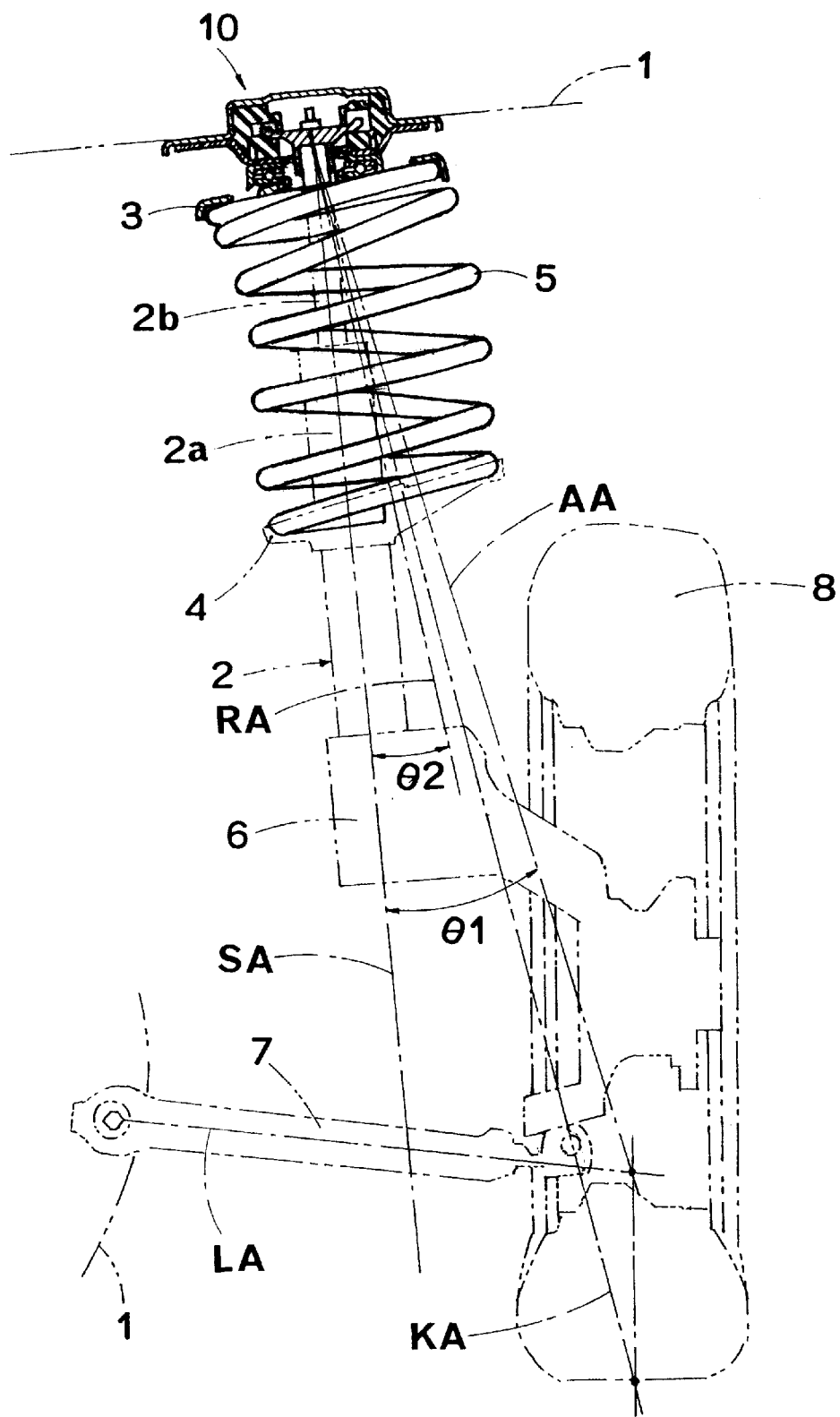
FIG. 2 is a front view of a helical compression spring of an embodiment of the present invention mounted on a vehicle suspension.
Figure 3:
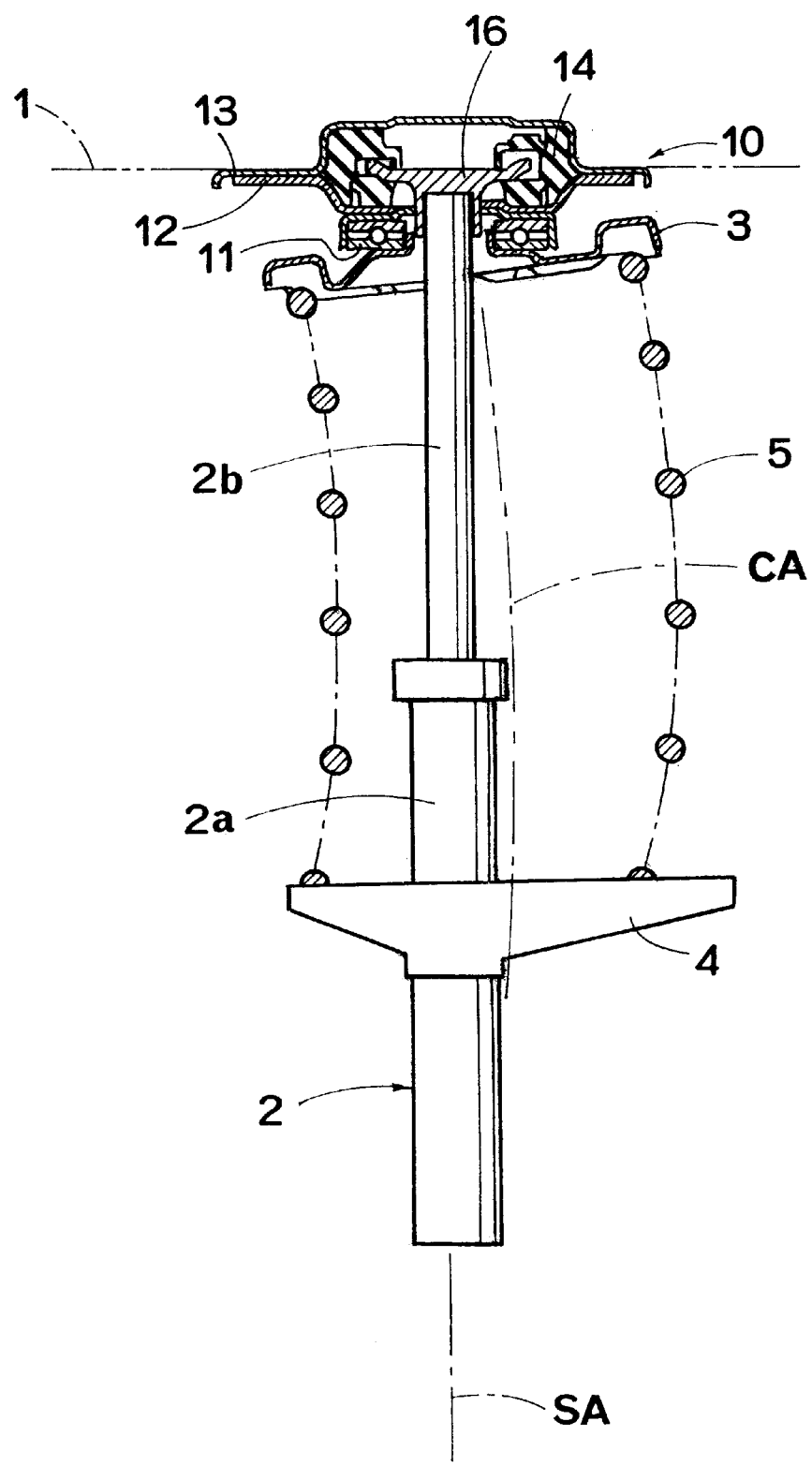
FIG. 3 is an enlarged sectional view of a helical compression spring of an embodiment of the present invention mounted on a strut of a vehicle suspension.

Referring to FIG.1, there is schematically illustrated a helical compression spring 5 (hereinafter, simply referred to as a helical spring 5) for use in a vehicle suspension. As shown in FIG. 2, the helical spring 5 is mounted on a strut type suspension (hereinafter, simply referred to as suspension), most of which are illustrated by two-dot chain lines except for a portion for supporting the upper end of the helical spring 5. FIG. 3 is an enlarged drawing of a portion of the suspension as shown in FIG. 2, on which the helical spring 5 as shown in FIG. 1 is mounted.

At the outset, the overall structure of the suspension will be explained with reference to FIG. 2. A strut 2 is elastically mounted at its upper end on a vehicle body 1, and an upper seat 3 is mounted on the vehicle body 1. A lower seat 4 is fixed to a middle portion of the strut 2. Between the upper seat 3 and the lower seat 4, the helical spring 5 is arranged to encircle therein the strut 2. The lower end of the strut 2 is fixed to a knuckle 6, which is pivotally mounted on the vehicle body 1 through a lower arm 7. Accordingly, a wheel 8 is mounted on the knuckle 6, which is connected to the vehicle body 1 through the strut 2 and the helical spring 5, and which is connected to the vehicle body 1 through the lower arm 7. The upper end of the strut 2 and the upper seat 3 are mounted on the vehicle body 1 thorough a strut mount 10, which will be described later in detail. The strut 2 is provided with a cylinder 2a and a rod 2b which is slidably mounted in the cylinder 2a, to form a shock absorber. The rod 2b is mounted at its upper end on the vehicle body 1 through the strut mount 10, and the cylinder 2a is fixed at its lower end to the knuckle 6, to form a structure similar to that disclosed in the aforementioned Japanese Utility Model No.48-39290.

According to the present embodiment, the helical spring 5 is formed with a coil axis CA thereof passing through the center of the upper end plane US curved at a predetermined radius of curvature in an unloaded state of the helical spring 5, to provide an initial curvature of curved amount (d) as shown in FIG. 1. Particularly, the coil axis CA is curved in accordance with two radiuses of curvature extending in the same direction. That is, the upper portion UP of the helical spring 5 has the coil axis CA curved at a first radius of curvature R1, and the lower portion LP of the helical spring 5 has the coil axis CA curved at a second radius of curvature R2. And, a pitch of a lower end coil 5a of the helical spring 5 has been set to tilt the end plane of the lower end coil 5a at a predetermined angle α to the lower seat 4 on which the lower end coil 5a is seated as shown by two-dot chain line in FIG. 1, in the direction for shortening the longitudinal length of the helical spring 5 at the inside of the curvature (i.e., left side in FIG. 1). In this case, the relationship between the lower end plane LS and the lower seat 4 is relative to each other. According to the embodiment as shown in FIG. 1, the lower seat 4 is placed on the horizontal plane, whereas the lower end plane LS is tilted by the predetermined angle α. On the contrary, the lower end plane LS may be placed on the horizontal plane, whereas the lower seat 4 may be tilted by the predetermined angle α. In order to manufacture the helical spring 5, its pitch is to be reduced with an element wire wound, to provide so called reverse pitch. If the inclination of the lower end plane LS is made large, therefore, it will be difficult to set the pitch. To solve this problem, according to the present embodiment, it is so arranged that the coil axis of the helical spring 5 is curved in accordance with two radiuses of curvature in its unloaded state.

As shown in FIG. 3, the helical spring 5 as formed above is arranged between the upper seat 3 and the lower seat 4, which are placed in parallel with each other as in the prior suspension. The helical spring 5 is so arranged that the coil axis CA is curved to extend outside of the vehicle. The strut mount 10 includes a lower bracket 12 for mounting the upper seat 3 on the vehicle body 1 through a bearing 11, an upper bracket 13 connected by bolts (not shown) to the vehicle body 1 together with the lower bracket 12, and a damper rubber 14 disposed between the lower bracket 12 and the upper bracket 13. According to the present embodiment, therefore, the strut mount 10 is of a type with load transmitted separately, wherein the strut 2 is mounted on the vehicle body 1 through the damper rubber 14, whereas the helical spring 5 is mounted on the vehicle body 1 through the bearing 11. As a result, any stress which is caused when the helical spring 5 is compressed and expanded can be absorbed properly. The damper rubber 14 is designed to pass the reaction force axis of the helical spring 5 through approximately the center of the upper end plane US.

Figure 4:
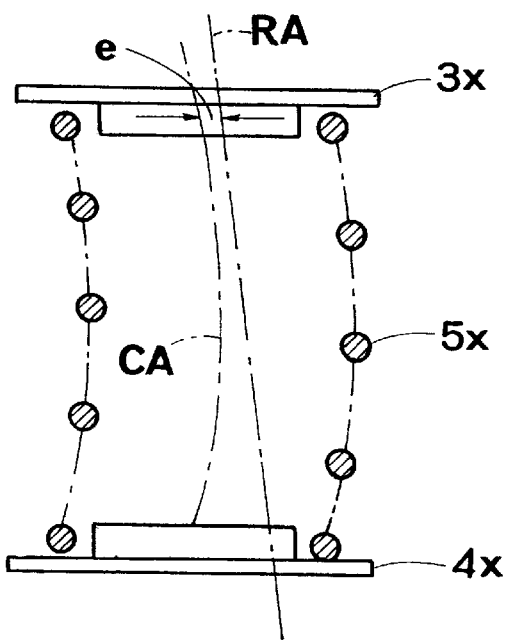
FIG. 4 is a sectional view of one example of a helical compression spring to be compared with the present invention.
Figure 5:
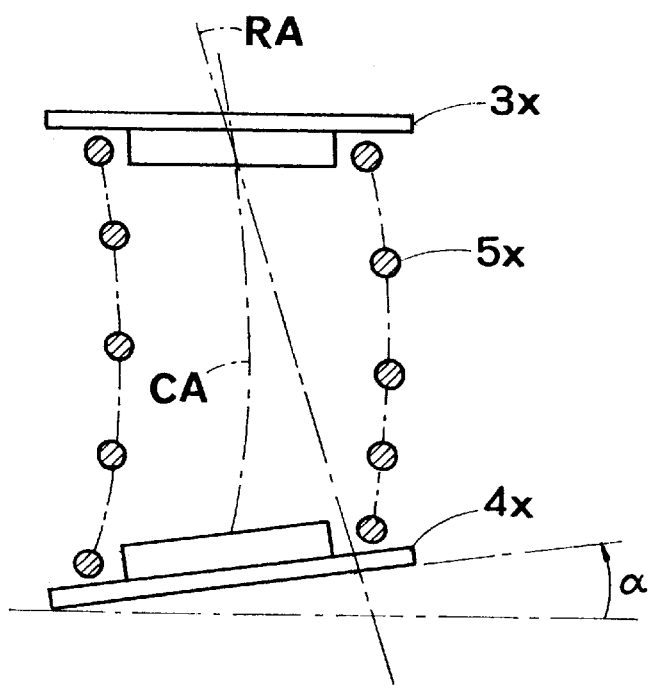
FIG. 5 is a sectional view of another example of a helical compression spring to be compared with the present invention.

In the mean time, only by initially curving a helical compression spring 5x as shown in FIG. 4 for example, the reaction force axis RA is shifted parallel, so that the point of application of the reaction force is displaced from the coil axis CA by a displacement as indicated by "e" in FIG. 4, which might cause eccentric wear on the bearing 11. In contrast to the helical spring as shown in FIG. 4, according to the present embodiment, the point of application of the reaction force is positioned approximately on the center of the upper end plane US, and at the same time it is positioned approximately on the coil axis CA in the same manner as the helical spring 5x as shown in FIG. 5. Therefore, the side force will be applied to the strut 2 without causing any eccentric wear on the bearing 11, as will be described later in detail with reference to FIGS. 12–14.

According to the suspension as shown in FIG. 2, the reaction force axis RA does not coincide with the load input axis AA. That is, the strut axis SA of the strut 2 and the load input axis AA form an angle θ1, whereas the strut axis SA and the reaction force axis RA form an angle θ2. In FIG. 2, "LA" designates the axis of the lower arm 7, "KA" designates the axis of a king pin (not shown). Due to the relationship between the reaction force axis RA and the strut axis SA which do not coincide with each other, sliding resistance may be caused between the cylinder 2a and the rod 2b of the strut 2. However, the sliding resistance will be compensated by the biasing force of the helical spring 5 to ensure a smooth sliding motion of the rod 2b, as will be described later.

Figure 6:
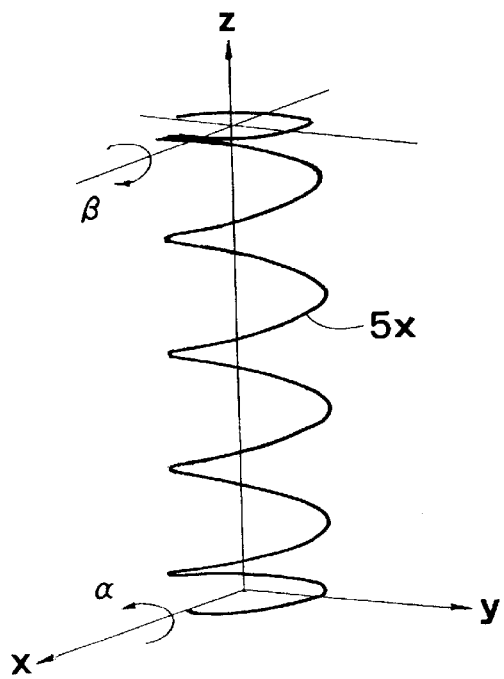
FIG. 6 is a perspective view showing a model of helical compression spring for experimenting a helical compression spring with an initial curvature to investigate influence on spring reaction force by tilting a lower end plane and/or an upper end plane of the spring.

FIG. 6 illustrates a model of a helical compression spring 5x, which is used for experimenting the helical compression spring with the initial curvature, the coil axis of which passes the center of the upper end plane and curves in accordance with a predetermined radius of curvature in an unloaded state, to investigate the influence on the spring reaction force by tilting the lower end plane of the spring to the lower seat, and/or by tilting the upper end plane of the spring to the upper seat. Hereinafter, will be described results of the experiments in the case where the helical spring 5x is compressed to shorten the longitudinal length of either side of the helical spring 5x, i.e., the lower end plane of the helical spring 5x is rotated about the x-axis counterclockwise by α degree as shown in FIG. 6, and the case where the upper end plane of the helical spring 5x is rotated about the x-axis clockwise by β degree.

Figure 7:
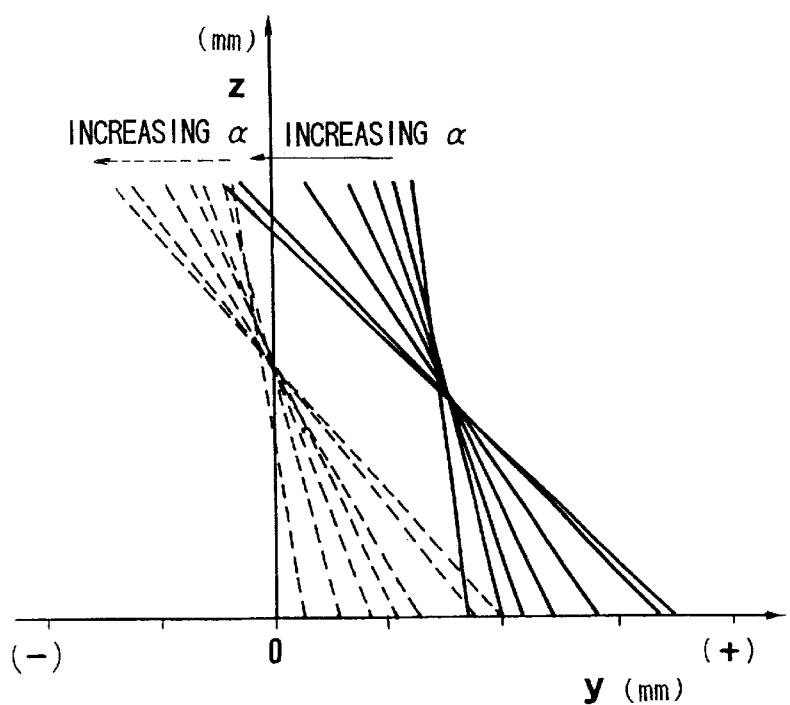
FIG. 7 is a diagram showing a variation of the reaction force axis of the helical spring as shown in FIG. 6 in the case where the lower end plane is rotated about the x-axis counterclockwise with the helical spring compressed to a predetermined height.

In FIG. 7 which shows the result obtained from the experiment, solid lines indicate variation of the reaction force axis of the helical spring 5x, in the case where the lower end plane is rotated about the x-axis counterclockwise, and broken lines indicate variation of the reaction force axis of the conventional helical compression spring in the same case as the former case. When a rotational angle which is rotated about the x-axis in FIG. 6, i.e., tilting angle α of the lower end plane, is increased, the upper end of the reaction force axis will move as indicated by the arrow. The reaction force axis lies on the line for connecting the points of application of the reaction forces acting on the upper end plane and lower end plane.

As shown in FIG. 7, the following results are obtained from the experiment.

(1) By initially curving the helical spring, the reaction force axis of the spring is displaced parallel in the y-direction, i.e., in the direction to which the spring is initially curved to extend.

(2) With increase of the tilting angle α in the counterclockwise direction in FIG. 6, the inclination of the reaction force axis of the spring in the y-direction increases. In other words, the reactive side force of the helical compression spring increases, with increase of the tilting angle α of the lower end plane.

(3) With increase of the tilting angle α of the lower end plane, the point of application of the reaction force on the upper end plane of the helical spring 5x gets close to the center of the upper end plane, i.e., z-axis in FIG. 7, as indicated by the solid lines, whereas the conventional spring gets away from the center of the upper end plane as indicated by the broken lines.

In the case where the upper end plane of the helical spring 5x is rotated clockwise about the x-axis with the helical spring 5x compressed to the predetermined height, the inclination of the reaction force axis of the spring in the y-direction decreases, i.e., the reactive side force of the helical spring 5x decreases, with increase of the tilting angle β of the upper end plane in the clockwise direction (Figure showing this relationship is omitted).

Figure 8:
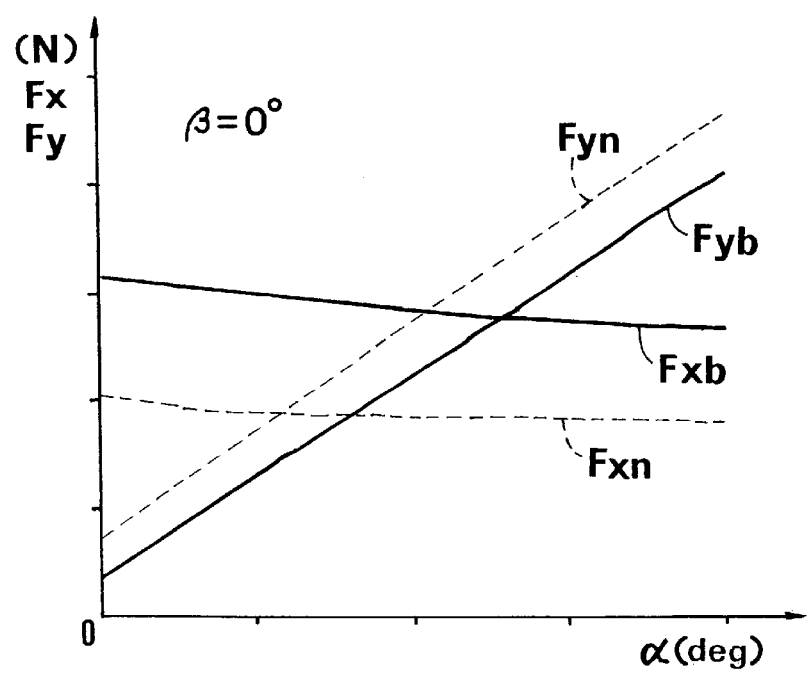
FIG. 8 is a diagram showing a variation of reactive side force of the helical spring as shown in FIG. 6 in the case where the lower end plane is rotated about the x-axis counterclockwise with the helical spring compressed to a predetermined height.

Therefore, in the case where the tilting angle of the upper end plane of the helical spring 5x is zero, when the lower end plane is rotated about the x-axis counterclockwise in FIG. 6 by the tilting angle α, the reactive side force will be varied as indicated by the solid lines in FIG. 8. The abscissa in FIG. 8 represents the tilting angle α of the lower end plane, and the ordinate represents the reactive side forces Fx, Fy in the x-direction and the y-direction, respectively. Solid lines indicate variations of the reactive side forces Fxb, Fyb of the helical spring 5 according to the present embodiment, whereas the broken lines indicate the variation of the reactive side forces Fxn, Fyn according to the conventional helical compression spring.

As shown in FIG. 8, the following results are obtained.

(1) If the helical spring 5x is initially curved in the y-direction, the reactive side force Fxb in the x-direction is increased, whereas the reactive side force Fyb in the y-direction is decreased, comparing with the reactive side forces Fxn, Fyn of the conventional helical compression spring.

(2) In the case where the lower end plane is rotated about the x-axis counterclockwise in FIG. 6 by the tilting angle α, the reactive side force Fyb in the y-direction is largely increased, with increase of the tilting angle α, whereas the reactive side force Fxb in the x-direction is slightly reduced.

(3) The absolute value of the reactive side force Fxb in the x-direction is not negligible, in order to have the reaction force axis of the spring coincide with an ideal offset line. In this respect, the reactive side force Fxb in the x-direction can be minimized by coinciding the curving direction of the spring with the direction of the reactive side force exerted when the spring is compressed between parallel seats, to adjust the position of end turn of the spring.

Figure 9:
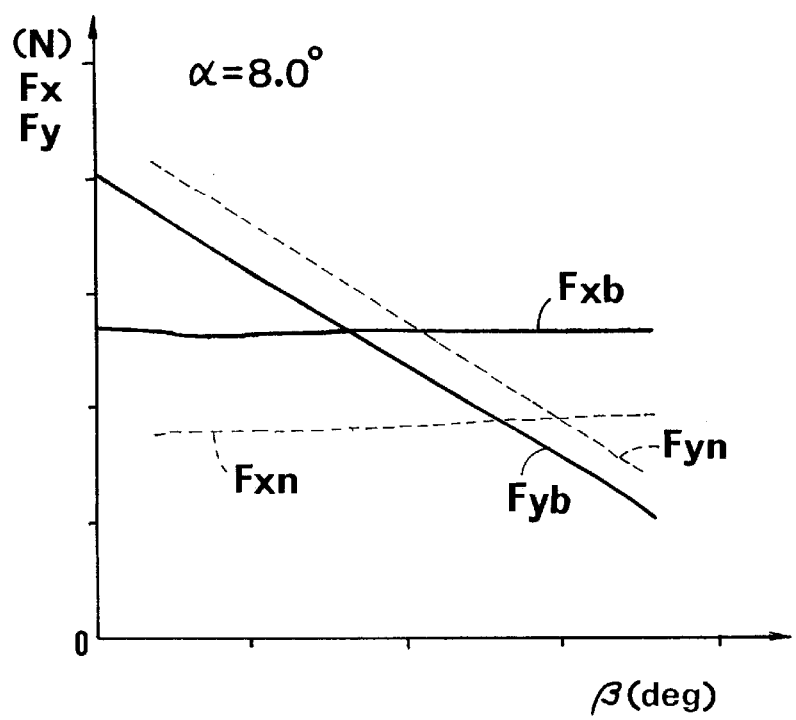
FIG. 9 is a diagram showing a variation of reactive side force of the helical spring as shown in FIG. 6 in the case where the lower end plane is rotated about the x-axis counterclockwise and the upper end plane is rotated about the x-axis clockwise, with the helical spring compressed to a predetermined height.

On the contrary, in the case where the lower end plane of the helical spring 5x is rotated about the x-axis counterclockwise in FIG. 6 by the tilting angle α of 8.0 degree, with the helical spring 5x compressed to the predetermined height, and at the same time the upper end plane of the helical spring 5x is rotated about the x-axis clockwise in FIG. 6, the reactive side forces Fxb, Fyb of the helical spring 5x will vary as indicated by the solid lines in FIG. 9, with increase of the tilting angle β of the upper end plane. The broken lines indicate the variation of the reactive side forces in the same case as the above case. Thus, referring to FIG. 9, it can be concluded that with increase of the tilting angle β of the upper end plane in the clockwise direction, the reactive side forces Fyb, Fyn in the y-direction are largely decreased, and the reactive side forces Fxb, Fxn are slightly increased.

In conclusion, according to the initially curved helical compression spring, (1) The reaction force axis is shifted parallel in the extending direction of the curved spring.

(2) When the lower end plane is tilted about the x-axis counterclockwise in FIG. 6, the reactive side force in the y-direction is largely increased, and the angle between the coil axis and the reaction force axis of the spring is increased.

(3) In the case where the lower end plane is rotated about the x-axis counterclockwise in FIG. 6 by the tilting angle α, the point of application of the reaction force on the upper end plane gets close to the center of the upper end plane, with increase of the tilting angle α.

(4) If the upper end plane is rotated about the x-axis clockwise in FIG. 6 by the tilting angle β, however, the reactive side force in the y-direction is largely decreased, with increase of the tilting angle β, to compensate the effect obtained when the lower end plane was tilted.

(5) Although the reactive side force in the direction vertical to the extending direction of the curved spring (i.e., the reactive side force in the x-direction) is large in value, it can be reduced as described before, and its variation caused by tilting the end plane will be as small as negligible.

According to the present embodiment, therefore, the curved amount (d) and the pitch of the lower end coil 5a for providing the tilting angle α (i.e., the rotational angle rotating clockwise in FIG. 1) are set, so as to be in the same state as that the lower seat 4x as shown in FIG. 5 is rotated counterclockwise by the tilting angle α, with the helical spring 5x compressed to a predetermined height, when the helical spring 5 is mounted between the upper seat 3 and the lower seat 4 as shown in FIG. 3. When the helical spring 5 formed as shown in FIG. 1 is mounted between the upper seat 3 and the lower seat 4 which are arranged in parallel with each other in the same manner as in the prior art, the helical spring 5 is installed as shown in FIGS. 2 and 3, to provide the same effect as in the case where the helical spring 5x is tilted to the lower seat 4x as shown in FIG. 5.

Figure 10:
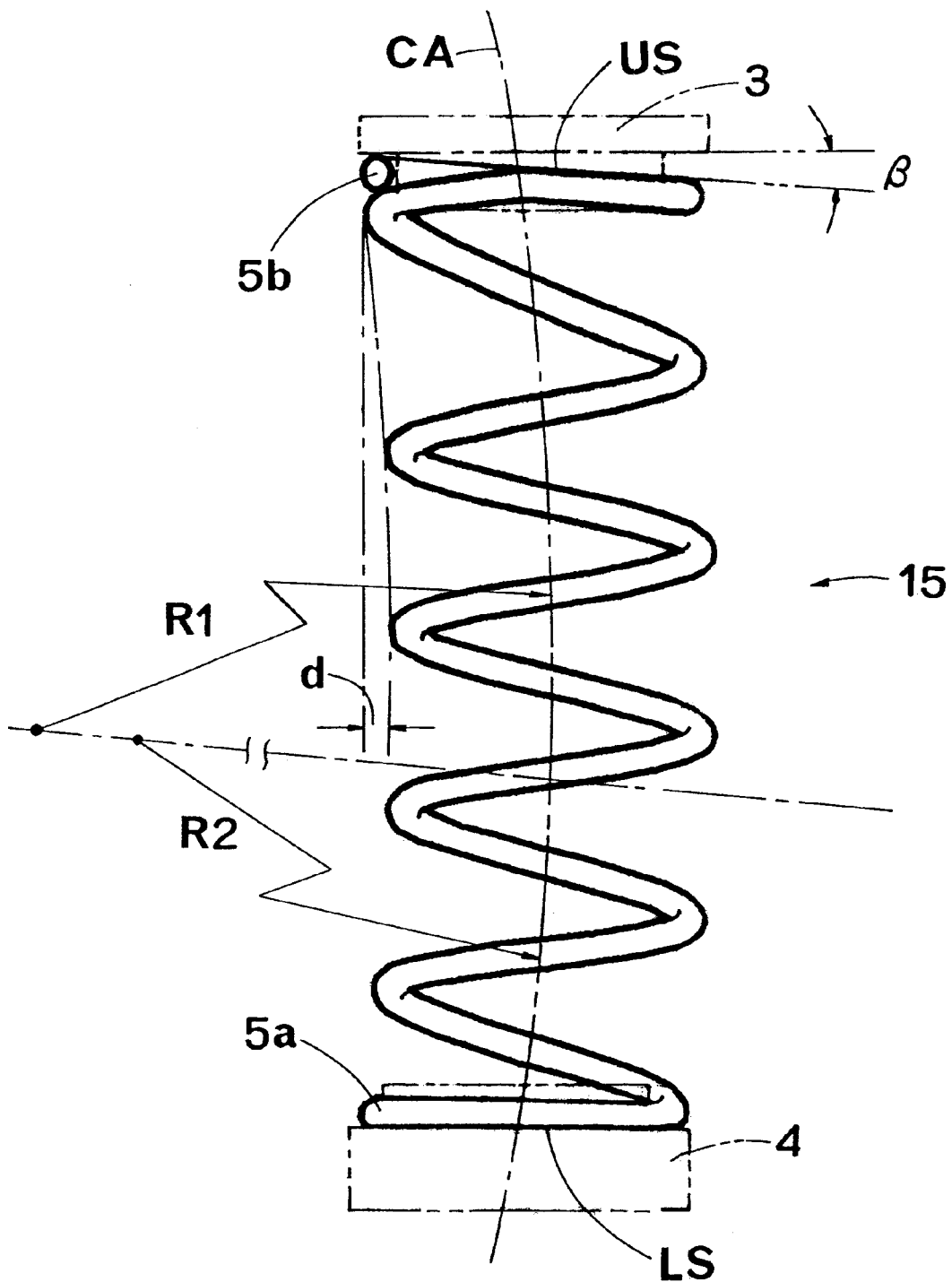
FIG. 10 is a sectional view of a helical compression spring according to another embodiment of the present invention.

FIG. 10 illustrates another embodiment of the present invention, in which the pitch of the upper end coil 5b of a helical compression spring (designated by 15 in this embodiment) has been set to tilt the end plane of the upper end coil 5b at the predetermined angle β to the upper seat 3 to be seated as shown by two-dot chain line in FIG. 10, in the direction for shortening the longitudinal length of the helical spring 15 at the outside of the curvature (i.e., right side in FIG. 10). The rest of the elements are substantially the same as the embodiment as described before, the elements equivalent to those described originally will be designated by the same reference numerals.

Figure 11:
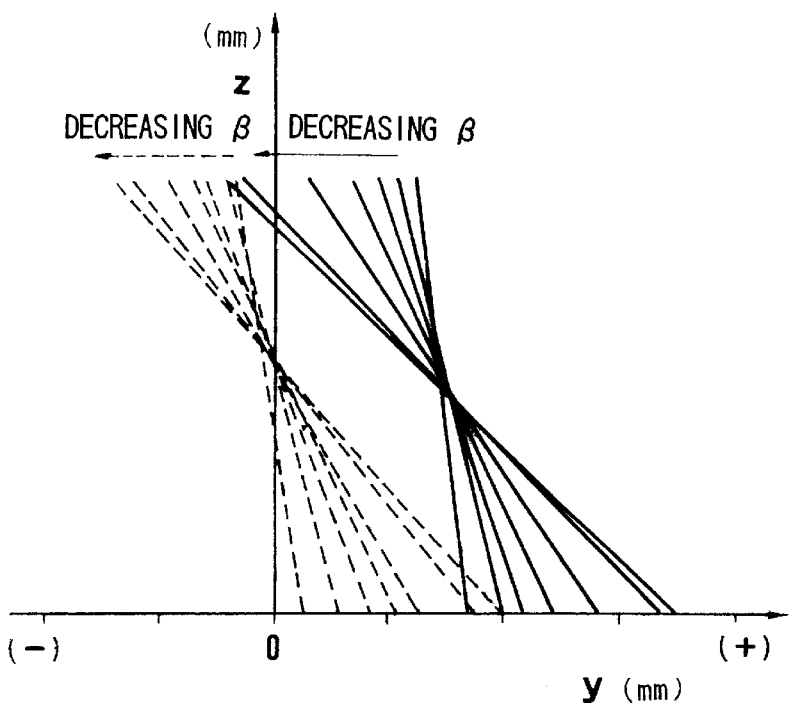
FIG. 11 is a diagram showing a variation of the reaction force axis of the helical spring as shown in FIG. 6 in the case where the upper end plane is rotated about the x-axis counterclockwise with the helical spring compressed to a predetermined height.

In FIG. 11, solid lines indicate variation of the reaction force axis of the helical spring 5x in the case where the upper end plane is rotated about the x-axis counterclockwise with the helical spring 5x compressed to a predetermined height, i.e., a reverse direction to the direction indicated by the arrow in FIG. 6. Since the direction of the arrow in FIG. 6 corresponds to the direction for increasing the angle β, the reverse direction corresponds to the direction for decreasing the angle β. And, the broken lines indicate variation of the reaction force axis of the conventional helical compression spring in the same case as the former case. FIG. 11 shows the variation of the reaction force axis of the spring, when a rotational angle which is rotated about the x-axis in FIG. 11, i.e., tilting angle β of the upper end plane, is increased in the direction opposite to the direction as indicated by the arrow in FIG. 6 (in other words, the decreasing direction of the angle β). By increasing the tilting angle β of the upper end plane in the direction opposite to the clockwise direction as indicated by the arrow in FIG. 6, i.e., counterclockwise direction, the inclination of the upper end plane in the y-direction will be increased. In other words, the reactive side force of the helical spring 5 is increased, with decrease of the tilting angle β of the upper end plane in the clockwise direction as indicated by the arrow in FIG. 6.

Accordingly, the curved amount (d) and the pitch of the upper end coil 5b for providing the tilting angle β in an unloaded state as shown in FIG. 10 are set, so as to be in the same state as that the upper end plane US is rotated counterclockwise by the tilting angle β, with the helical spring 5x compressed to the predetermined height as shown in FIG. 6, when the helical spring 15 in FIG. 10 is mounted between the upper seat 3 and the lower seat 4 as shown in FIG. 2. When the helical spring 5 formed as shown in FIG. 10 is mounted between the upper seat 3 and the lower seat 4 arranged in parallel with each other in the same manner as in the prior art, to provide the same effect as in the case disclosed in FIG. 11.

Figure 12:
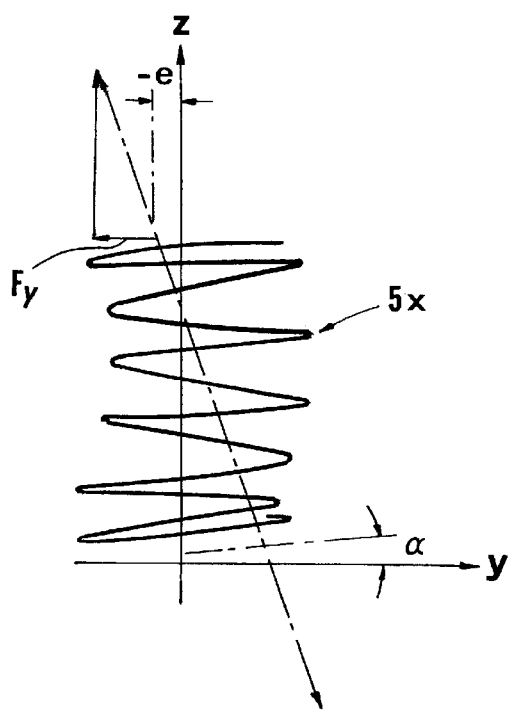
FIG. 12 is a characteristic diagram showing a relationship of reaction force in the case where the lower end plane of the helical spring as shown in FIG. 6 is rotated about the x-axis counterclockwise with the helical spring compressed to a predetermined height.
Figure 13:
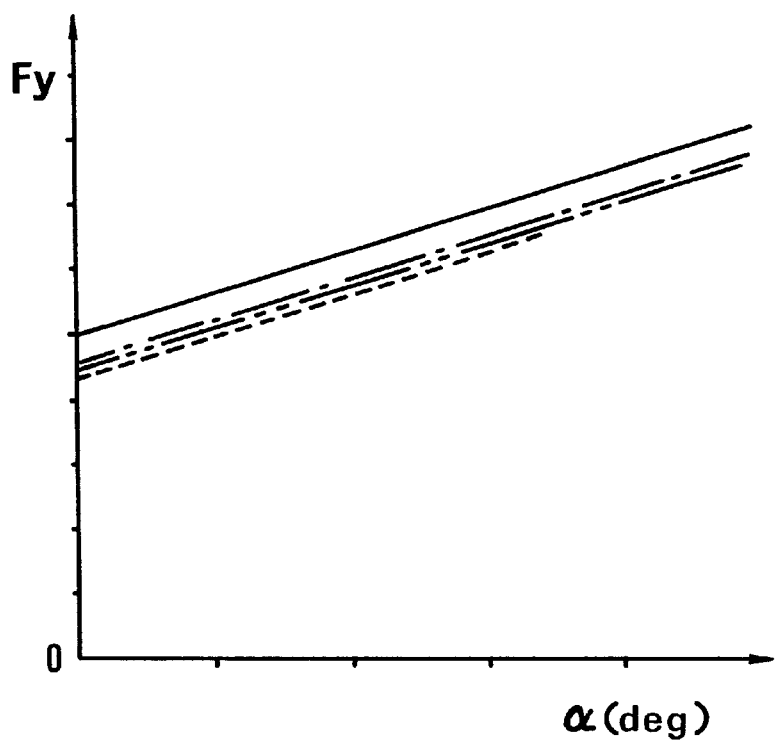
FIG. 13 is a diagram showing a variation of the reactive side force of the helical spring as shown in FIG. 6 in accordance with a tilting angle a of the lower plane, in the case where the lower end plane is rotated about the x-axis counterclockwise with the helical spring compressed to a predetermined height.
Figure 14:
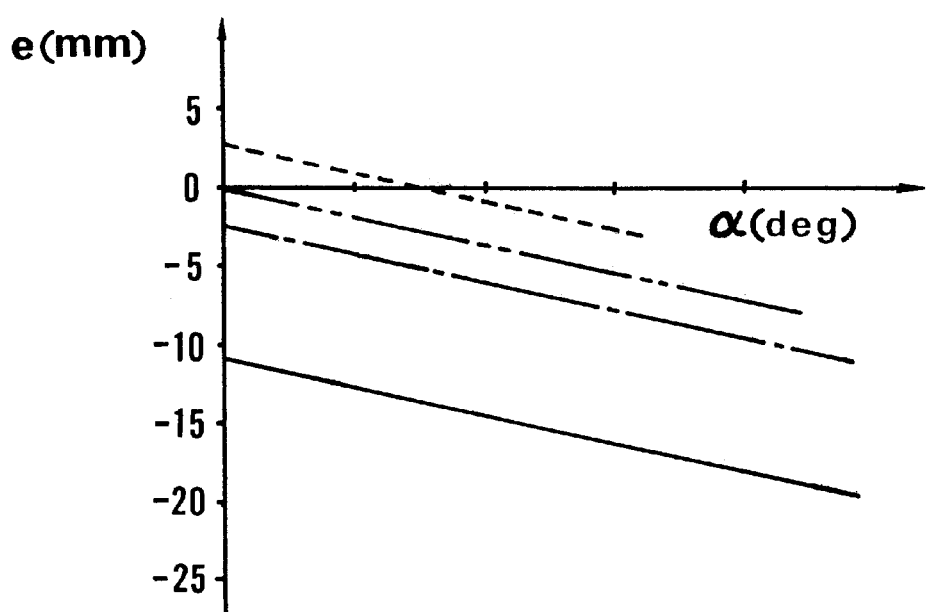
FIG. 14 is a diagram showing a displacement of the point of application of reaction force caused in accordance with a variation of a tilting angle α of the lower plane of the helical spring as shown in FIG. 6, in the case where the lower end plane is rotated about the x-axis counterclockwise with the helical spring compressed to a predetermined height.

Referring to FIGS. 12–14, it can be concluded that by tilting the lower end plane of the helical compression spring 5x with the initial curvature as shown in FIG. 6, the reaction force axis RA will pass approximately the center of the upper end plane. FIG. 12 illustrates a state of forces exerted in the case where the lower end plane of the helical spring 5x as shown in FIG. 6 is rotated about the x-axis counterclockwise in FIG. 6, with the helical spring 5x compressed to the predetermined height. As can be seen in FIGS. 13 and 14, the reactive side force Fy and the displacement (e) of the point of application of force will vary in accordance with the tilting angle α of the lower end plane of the helical spring 5x to the lower seat (not shown in FIG. 12).

FIGS. 13 and 14 show the results obtained from the experiment, wherein solid lines indicate the result of the experiment for a helical compression spring without being curved, one-dot chain lines indicate the result for a helical compression spring which was curved by 10 mm of the curved amount (d), two-dot chain lines indicate the result for a helical compression spring which was curved by 13 mm, and broken lines indicate the result for a helical compression spring which was curved by 16 mm. As can be seen from the results of those experiments, with increase of the radius of curvature, the reactive side force Fy is decreased, and the point of application of reaction force on the upper end plane is sifted in the extending direction of the curvature. And, in the case where the lower end plane is tilted by the tilting angle α, with increase of the angle α, the reactive side force Fy is increased, and the point of application of force on the upper end plane is sifted in the direction opposite to the extending direction of the curvature of the helical spring.

Figure 15:
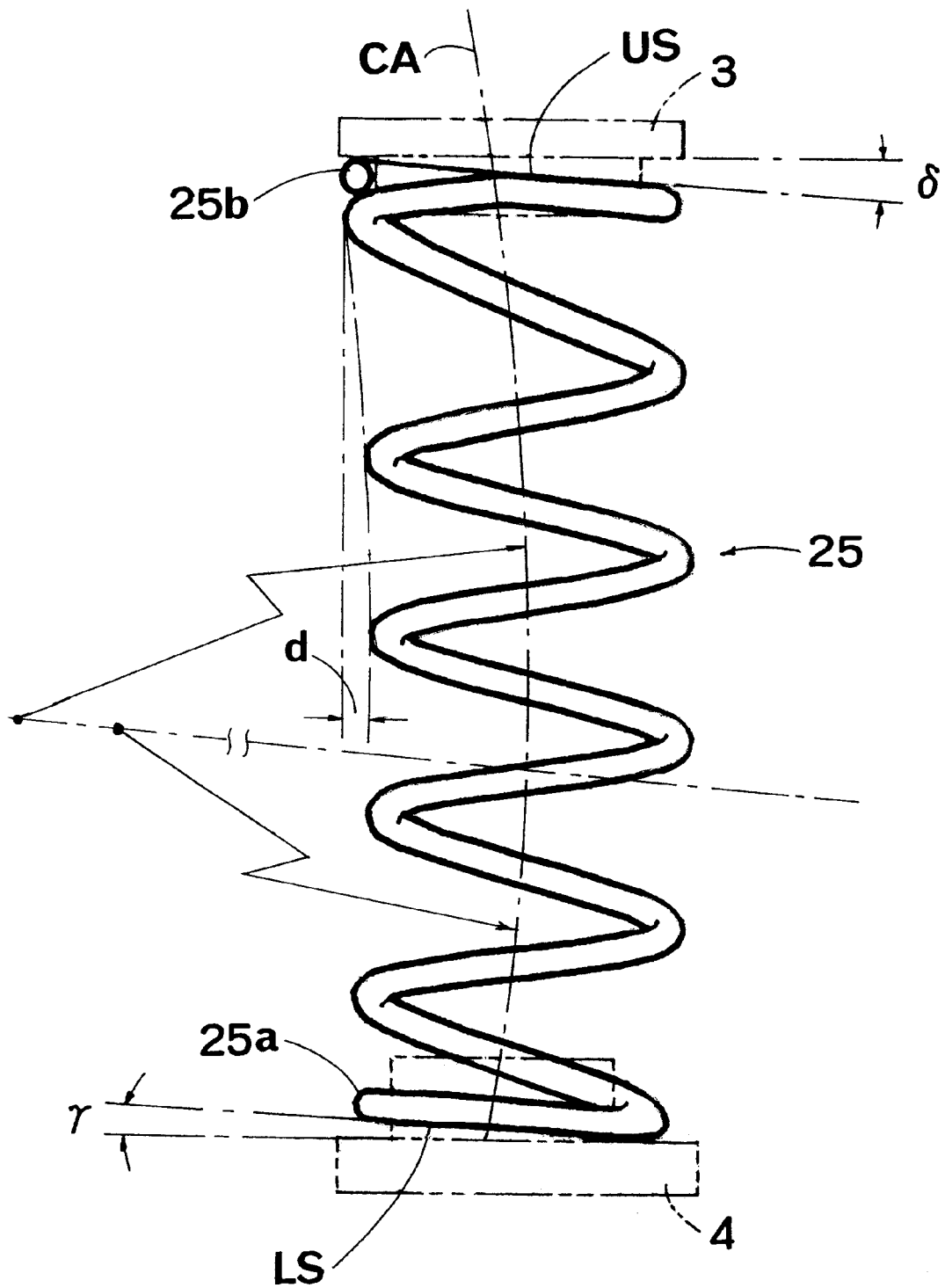
FIG. 15 is a sectional view of a helical compression spring according to a further embodiment of the present invention.

FIG. 15 illustrates a further embodiment of the present invention, in which a helical compression spring 25 has the coil axis CA curved at one or two radius of curvature in the unloaded state. In this embodiment, the pitch of the lower end coil 25a of the helical spring 25 has been set to tilt the end plane of the lower end coil 25a at a predetermined angle γ to the lower seat 4, in the direction for shortening the longitudinal length of the helical spring 25 at the inside of the curvature (i.e., left side in FIG. 15). And, the pitch of the upper end coil 25b of the helical spring 25 has been set to tilt the end plane of the upper end coil 25b at a predetermined angle δ to the upper seat 3, in the direction for shortening the longitudinal length of the helical spring 25 at the outside of the curvature (i.e., right side in FIG. 15).

Figure 16:
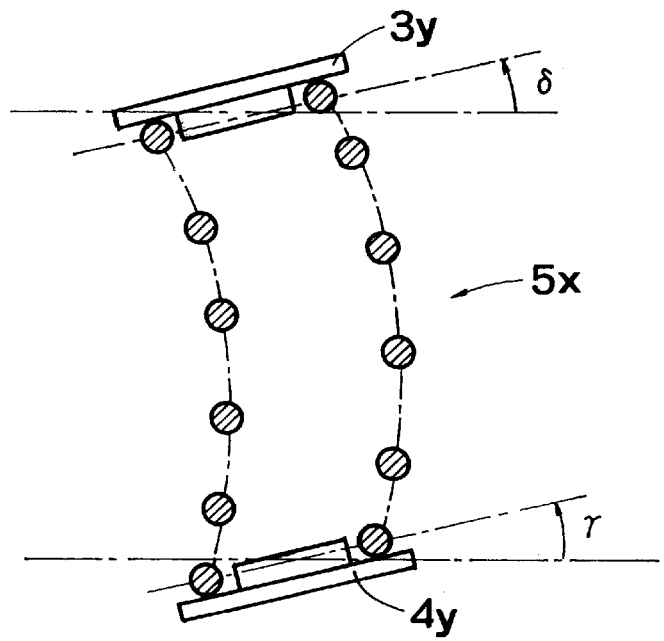
FIG. 16 is a sectional view of one example of a helical compression spring to be compared with the spring as shown in FIG. 15.

In other words, the tilting angles γ, δ of the lower end plane LS and upper end plane US, and the pitches of the upper end coil 25b and lower end coil 25a are set, so as to be in the same state, when the helical spring 25 formed as shown in FIG. 15 is mounted between the upper seat 3 and the lower seat 4 which were arranged in parallel with each other as shown by two-dot chain line, as that the lower seat 4y or the lower end plane of the helical spring 5x as shown in FIG. 16 is rotated about the x-axis counterclockwise by the angle γ, and also the upper seat 3y or the upper end plane of the helical spring 5x is rotated about the x-axis counterclockwise by the angle δ, with the arched helical spring 5x compressed to a predetermined height. Accordingly, when the helical spring 25 as shown in FIG. 15 is mounted between the upper seat 3 and the lower seat 4 which were arranged in parallel with each other in the same manner as in the prior art, the same effects as those in the embodiment as disclosed in FIGS. 1 and 10 can be obtained.

Figure 17:
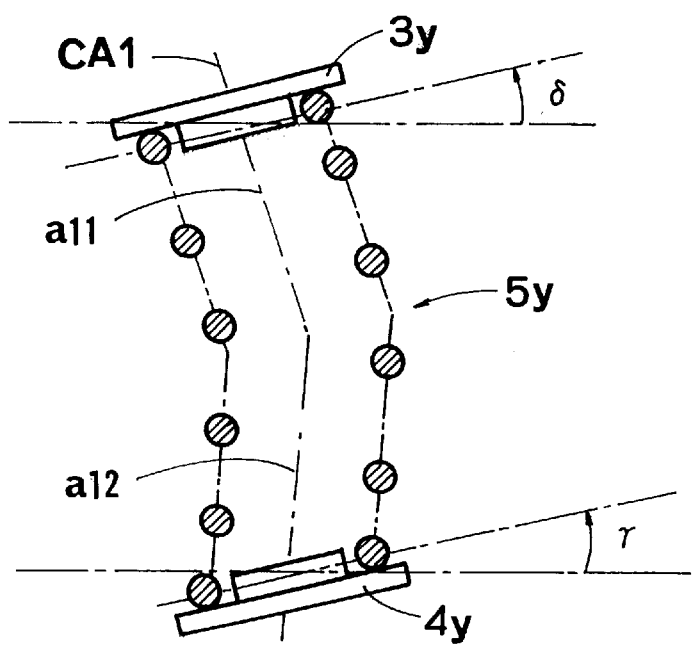
FIG. 17 is a sectional view of another example of a helical compression spring to be compared with the spring as shown in FIG. 15.
Figure 18:
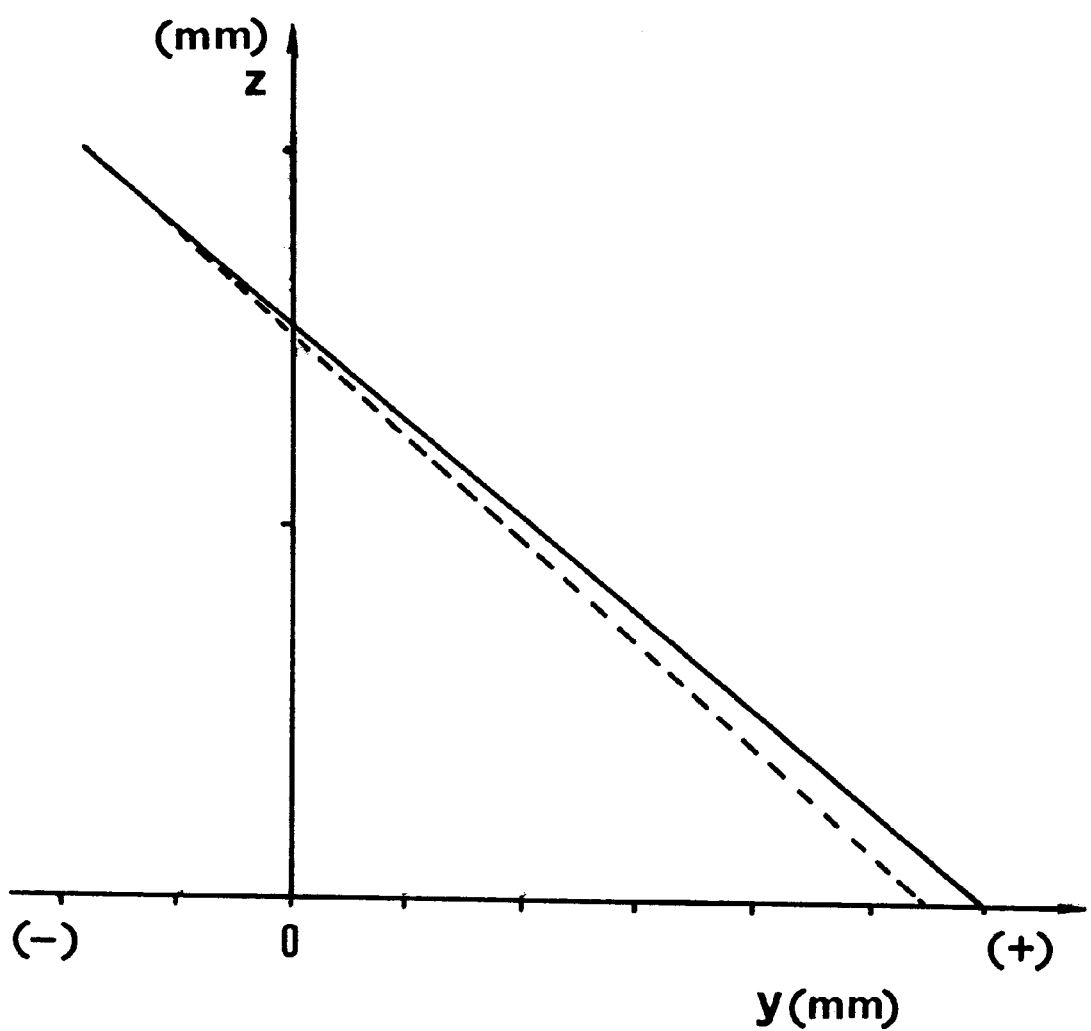
FIG. 18 is a diagram showing variations of the reaction force axes of the helical springs as shown in FIGS. 16 and 17 which are mounted between an upper seat and a lower seat, which are tilted counterclockwise at the angles δ, γ, respectively.

In either embodiment, the helical spring has the arch coil axis curved at two radiuses of curvature in the unloaded state. The coil axis is not necessarily formed in an arch shape or a circular shape, but may be substantially curved at a predetermined radius of curvature to obtain the same effects as those obtained in the embodiments as disclosed in FIGS. 1 and 10. As shown in FIG. 17 for example, a coil axis CA1 can be formed by a series of two rectilinear lines a11, a12 to be substantially curved at a predetermined radius of curvature. In FIG. 18, a broken line indicates the reaction force axis of the helical spring 5x which is curved in the arch shape as shown in FIG. 16 and which is mounted between the upper seat 3y and the lower seat 4y, which are tilted counterclockwise at the angles δ, γ, respectively. A solid line in FIG. 18 indicates the reaction force axis of the helical spring 5y which is curved substantially at the predetermined radius of curvature by the rectilinear lines a11, a12 as shown in FIG. 17 and which is mounted between the upper seat 3y and the lower seat 4y, which are tilted counterclockwise at the angles δ, γ, respectively. As can be seen from FIG. 18, according to the helical spring 5y as shown in FIG. 17, which is curved substantially at the predetermined radius of curvature by the rectilinear lines a11, a12, if the substantial radius of curvature is approximately the same in magnitude as the radius of curvature of the helical spring 5x, the reaction force axis of the spring 5y will be approximately the same as that of the spring 5x.

Figure 19:
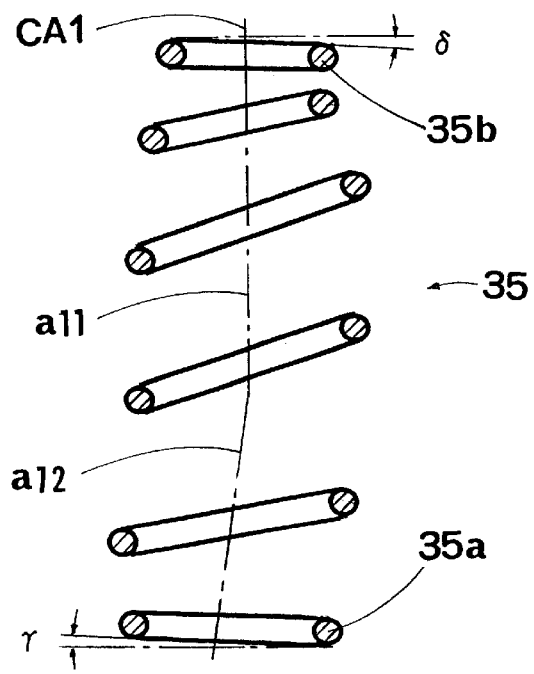
FIG. 19 is a sectional view of a helical compression spring having a coil axis curved substantially at a predetermined radius of curvature by a series of two rectilinear lines.

In stead of the helical spring 25 as shown in FIG. 15, therefore, a helical compression spring 35 as shown in FIG. 19 may be employed. The coil axis CA1 of the helical spring 35 is substantially curved at a predetermined radius of curvature by a series of the rectilinear lines a11, a12, and a pitch of a lower end coil 35a is set in such a manner that the lower end plane of the helical spring 35 is tilted at a predetermined angle γ to a lower seat (not shown) so as to shorten the longitudinal length of the inside of the curvature (left side in FIG. 19), and that the upper end plane of the helical spring 35 is tilted at a predetermined angle δ to an upper seat (not shown) so as to shorten the longitudinal length of the outside of the curvature (right side in FIG. 19). According to the helical spring 35, therefore, substantially the same effect as the effect obtained by using the helical spring 25 in FIG. 15 may be obtained.

Figure 20:
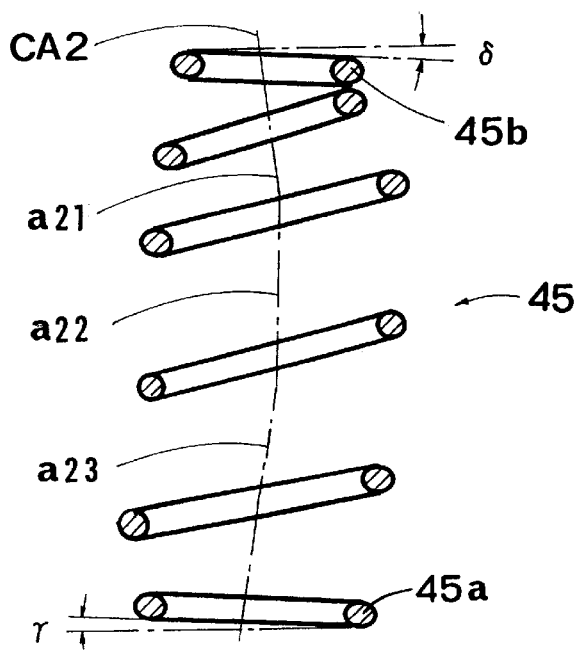
FIG. 20 is a sectional view of a helical compression spring having a coil axis curved substantially at a predetermined radius of curvature by a series of three rectilinear lines.

Or, as shown in FIG. 20, a coil axis CA2 can be formed by a series of three rectilinear lines a21, a22, a23 to be substantially curved at a predetermined radius of curvature. In FIG. 20, a pitch of a lower end coil 45a is set in such a manner that the lower end plane of the helical spring 45 is tilted at a predetermined angle γ to a lower seat (not shown) so as to shorten the longitudinal length of the inside of the curvature (left side in FIG. 20), and that the upper end plane of the helical spring 45 is tilted at a predetermined angle δ to an upper seat (not shown) so as to shorten the longitudinal length of the outside of the curvature (right side in FIG. 20). According to the helical spring 45, therefore, substantially the same effect as the effect obtained by using the helical spring 25 in FIG. 15 may be obtained.

Figure 21:
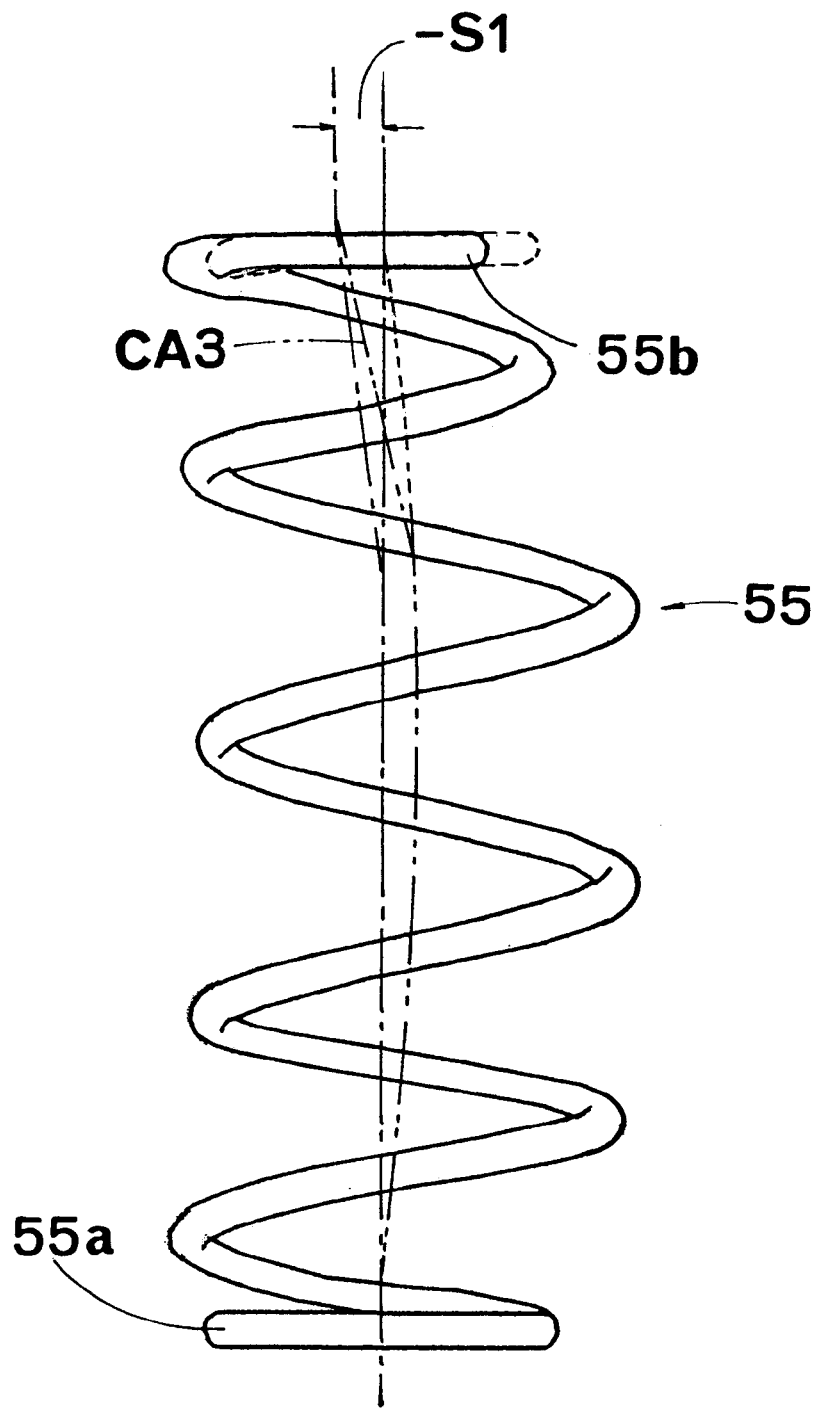
FIG. 21 is a front view of a helical compression spring according to a further embodiment of the present invention.
Figure 22:
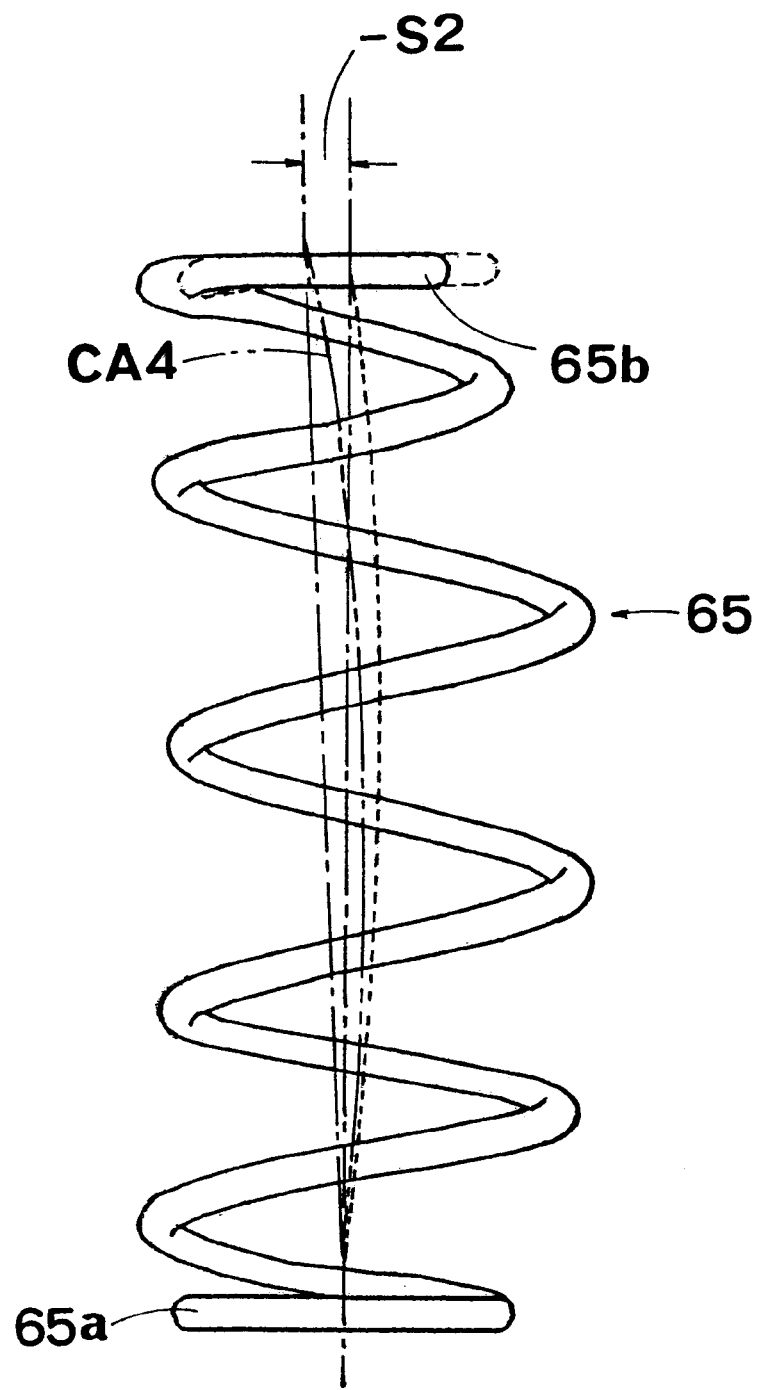
FIG. 22 is a front view of a helical compression spring according to a yet further embodiment of the present invention.
Figure 23:
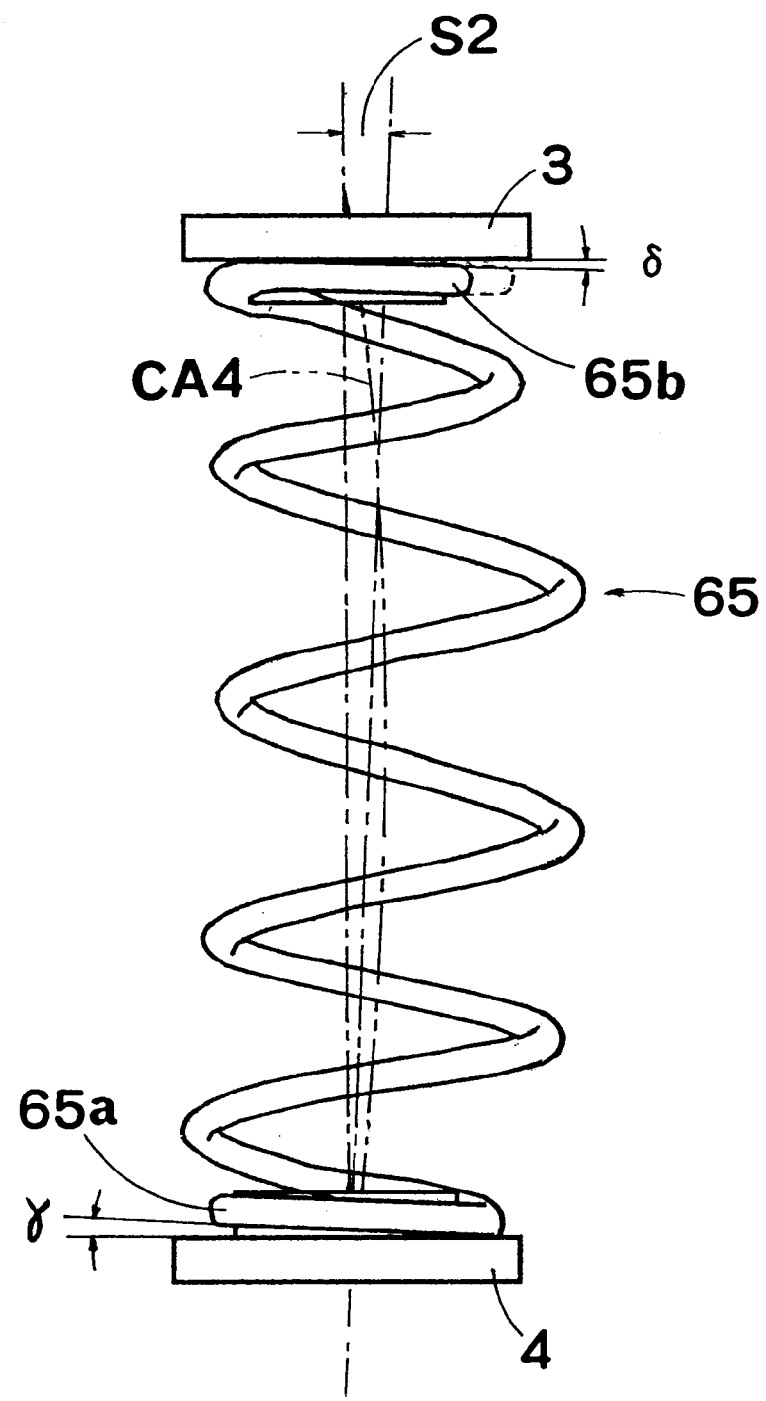
FIG. 23 is a front view of a helical compression spring as shown in FIG. 22, which is mounted between an upper seat and a lower seat.
Figure 24:
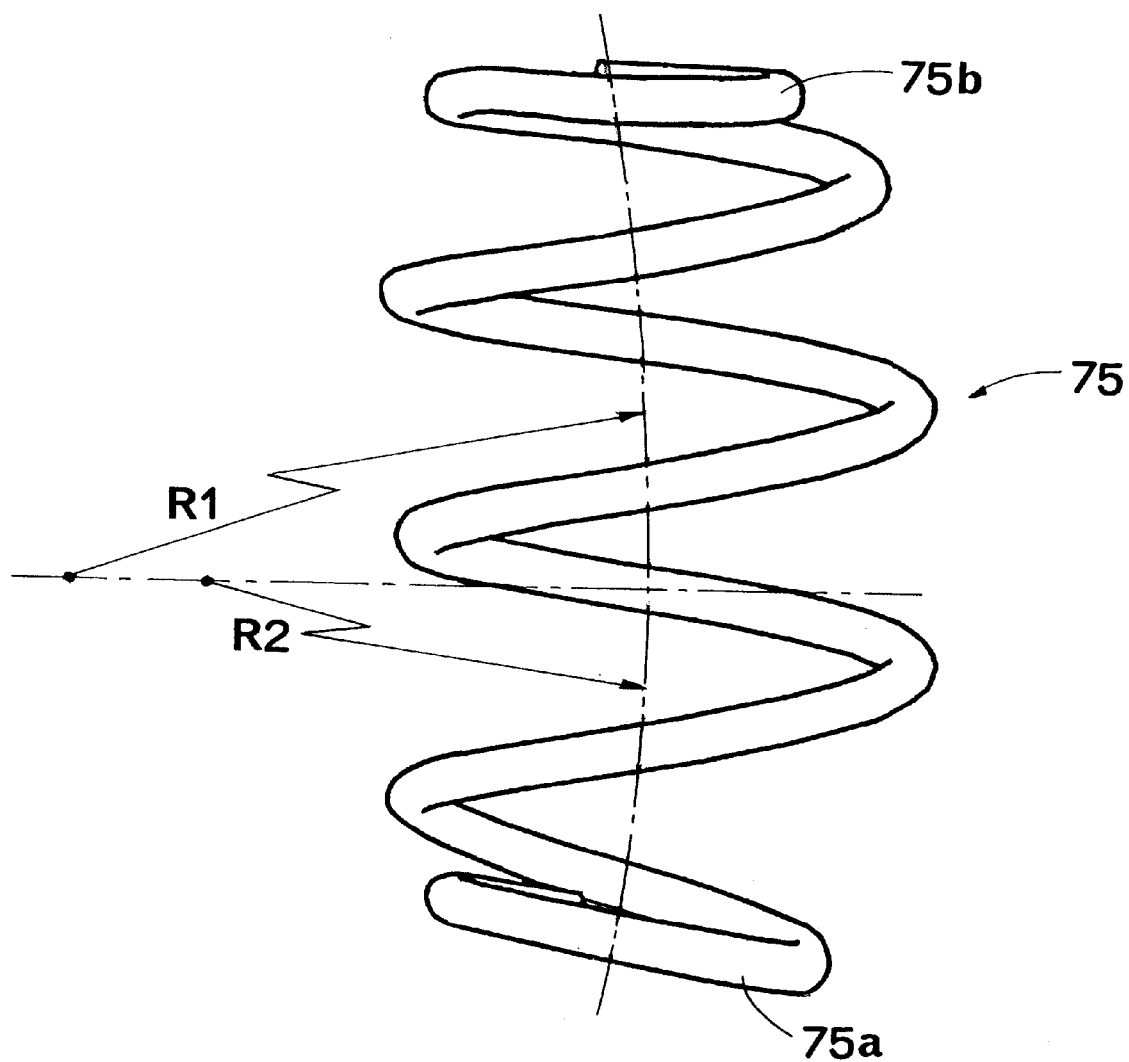
FIG. 24 is a front view of a helical compression spring according to a yet further embodiment of the present invention.

Referring to FIGS. 21–23, will be explained further embodiments of the present invention, wherein helical compression springs 55, 65 as shown in FIGS. 21, 22 are formed in such a manner that the coil axes CA3, CA4 are curved at one or two radius of curvature at their unloaded states, respectively. And, the pitches of lower end coils 55a, 65a are set in such a manner that the lower end planes of the helical springs 55, 65 are tilted at a predetermined angle γ to lower seats (not shown) so as to shorten the longitudinal length of the inside of the curvature (left side in FIGS. 21, 22), respectively. Furthermore, the coil axes CA3, CA4 are set in such a manner that the center of the upper end coil 55b and the center of the upper end coil 65b are offset to the center of the lower end coil 55a and the center of the lower end coil 65a, in the direction of the inside of the curvature (left side in FIGS. 21, 22), by the horizontal distances S1, S2, respectively.

When the helical spring 65 as shown in FIG. 22 for example is mounted between the upper seat 3 and the lower seat 4, as shown in FIG. 23, the center of the end plane of the upper end coil 65b, which is offset by the distance S2 to the center of the end plane of the lower end coil 65a, will coincide with the center of the upper seat 3 which is not offset to the center of the lower seat 4. As a result, the helical spring 65 is held in the same state that the upper end plane of the upper end coil 65b is rotated counterclockwise by the angle δ as shown in FIG. 23, so that substantially the same effect as the effect obtained by using the helical spring 25 in FIG. 15 may be obtained.

Thus, the helical springs 55, 65 as shown in FIGS. 21, 22 can be formed very easily, comparing with the aforementioned springs that need to set the pitches so as to tilt the upper end planes. In contrast to the helical springs 55, 65 as shown in FIGS. 21, 22, the coil axes may be set in such a manner that the center of the lower end coil 55a and the center of the lower end coil 65a are offset to the center of the upper end coil 55b and the center of the upper end coil 65b, in the direction of the outside of the curvature (right side in FIGS. 21, 22), respectively.

Next, will be explained a yet further embodiment of the present invention, wherein a helical compression spring 75 has a lower end coil 75a and an upper end coil 75b, both of which are formed in a so-called pig tail configuration. According to this embodiment, therefore, the height of the helical spring 75 when compressed can be made short, and a stroke of the suspension having the helical spring 75 can be made large. Although the lower end plane of the lower end coil 75a is tilted at a predetermined angle to a lower seat (not shown), in the same manner as that of the aforementioned helical spring 5, the upper end plane of the upper end coil 75b may be tilted at a predetermined angle to an upper seat (not shown), or both of the end coils may be tilted. Furthermore, although a coil axis of the helical spring 75 is curved in accordance with two radiuses of curvature in its unloaded state, it may be curved in accordance with a single radius of curvature.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A helical compression spring mounted on a vehicle body to be compressed between an upper seat and a lower seat, a coil axis of said spring is substantially curved at a predetermined radius of curvature in an unloaded state of said spring, with opposite end planes of said spring formed to be seated on said upper seat and lower seat, respectively, and a pitch of a lower end coil of said spring is set to tilt the end plane of said lower end coil at a first predetermined angle to said lower seat in the direction for shortening the longitudinal length of said spring at the inside of the curvature, and the center of the end plane of said upper end coil is offset to the center of the end plane of said lower end coil in the direction of the inside of the curvature.

2. The helical compression spring of claim 1, wherein the coil axis of said spring is substantially curved in accordance with at least two radiuses of curvature in the unloaded state of said spring.

3. The helical compression spring of claim 1, wherein the coil axis of said spring comprises a plurality of rectilinear lines connected to be substantially curved at the predetermined radius of curvature in the unloaded state of said spring.

4. The helical compression spring of claim 1, wherein said upper end coil of said spring is formed in a pig tail configuration.

5. A helical compression spring mounted on a vehicle body to be compressed between an upper seat and a lower seat, a coil axis of said spring is substantially curved at a predetermined radius of curvature in an unloaded state of said spring, with opposite end planes of said spring formed to be seated on said upper seat and lower seat, respectively, a pitch of an upper end coil of said spring is set to tilt the end plane of said upper end coil at a second predetermined angle to said upper seat in the direction for shortening the longitudinal length of said spring at the outside of the curvature, and the center of the end plane of said lower end coil is offset to the center of the end plane of said upper end coil in the direction of the outside of the curvature.

6. The helical compression spring of claim 5, wherein the coil axis of said spring is substantially curved in accordance with at least two radiuses of curvature in the unloaded state of said spring.

7. The helical compression spring of claim 5, wherein the coil axis of said spring comprises a plurality of rectilinear lines connected to be substantially curved at the predetermined radius of curvature in the unloaded state of said spring.

8. The helical compression spring of claim 5, wherein said lower end coil of said spring is formed in a pig tail configuration.

9. A helical compression spring mounted on a vehicle body to be compressed between an upper seat and a lower seat, a coil axis of said spring is substantially curved at a predetermined radius of curvature in an unloaded state of said spring, with opposite end planes of said spring formed to be seated on said upper seat and lower seat, respectively, and a pitch of an upper end coil is set to tilt the end plane of said upper end coil at a second predetermined angle to said upper seat in the direction for shortening the longitudinal length of said spring at the outside of the curvature.

10. The helical compression spring of claim 9, wherein the coil axis of said spring is substantially curved in accordance with at least two radiuses of curvature in the unloaded state of said spring.

11. The helical compression spring of claim 9, wherein the coil axis of said spring comprises a plurality of rectilinear lines connected to be substantially curved at the predetermined radius of curvature in the unloaded state of said spring.

12. The helical compression spring of claim 9, wherein at least one of said upper end coil and said lower end coil of said spring is formed in a pig tail configuration.

13. A helical compression spring mounted on a vehicle body to be compressed between an upper seat and a lower seat, a coil axis of said spring is substantially curved at a predetermined radius of curvature in an unloaded state of said spring, with opposite end planes of said spring formed to be seated on said upper seat and lower seat, respectively, and a pitch of a lower end coil of said spring is set to tilt the end plane of said lower end coil at a first predetermined angle to said lower seat in the direction for shortening the longitudinal length of said spring at the inside of the curvature, and a pitch of an upper end coil is set to tilt the end plane of said upper end coil at a second predetermined angle to said upper seat in the direction for shortening the longitudinal length of said spring at the outside of the curvature.

14. The helical compression spring of claim 13, wherein the coil axis of said spring is substantially curved in accordance with at least two radiuses of curvature in the unloaded state of said spring.

15. The helical compression spring of claim 13, wherein the coil axis of said spring comprises a plurality of rectilinear lines connected to be substantially curved at the predetermined radius of curvature in the unloaded state of said spring.

16. The helical compression spring of claim 13, wherein at least one of said upper end coil and said lower end coil of said spring is formed in a pig tail configuration.

* * * * *